(12) United States Patent
Itou et al.

(10) Patent No.: US 6,762,386 B2
(45) Date of Patent: Jul. 13, 2004

(54) SWITCHGEAR

(75) Inventors: Shunji Itou, Hitachi (JP); Kazuhiro Fujii, Hitachi (JP); Yoshiaki Inami, Hitachi (JP); Katsuyuki Takada, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/235,891

(22) Filed: Sep. 6, 2002

(65) Prior Publication Data

US 2003/0128501 A1 Jul. 10, 2003

(30) Foreign Application Priority Data

Jan. 9, 2002 (JP) ........................................ 2002-001890

(51) Int. Cl.$^7$ .............................................. H01H 33/18
(52) U.S. Cl. .............................. 218/43; 218/7; 361/605
(58) Field of Search ...................... 218/155, 75, 78–80, 218/84, 7, 13, 14, 43, 44; 361/611, 618, 612

(56) References Cited

U.S. PATENT DOCUMENTS 4,821,141 A * 4/1989 Torimi et al. ............... 361/612
5,045,968 A * 9/1991 Suzuyama et al. .......... 361/618
5,450,281 A * 9/1995 Tanaka et al. .............. 361/611

FOREIGN PATENT DOCUMENTS

JP        10-285728        10/1998

* cited by examiner

*Primary Examiner*—Lincoln D. Donovan
*Assistant Examiner*—M. Fishman
(74) *Attorney, Agent, or Firm*—Mattingly, Stanger & Malur, P.C.

(57) ABSTRACT

A switchgear wherein a connecting portion to be connected to a transmission side branch bus container and a connecting portion to be connected to a receiving side branch bus container are provided on a circuit breaker container in an up and down relation so as to face the same direction. Any one of the transmission side branch bus container and the receiving side branch bus container is connected to the connecting portion positioned on the upper side, and the other is connected to the connecting portion positioned on the lower side, and a transmission side power cable terminal container or a receiving side power cable terminal container is arranged at a position deviated horizontally from the axis of the transmission side branch bus container or the receiving side branch bus container.

9 Claims, 4 Drawing Sheets

SWITCHGEAR

BACKGROUND OF THE INVENTION

The present invention relates to a switchgear and more particularly, to a switchgear which uses an insulation arc-extinguishing medium such as $SF_6$ gas and the arrangement of respective apparatuses of which is improved.

In recent years, in order to effectively supply power to large city areas, such tendency becomes strong that power systems of high voltage are directly introduced into over-populated streets and underground, and according to this tendency, gas-insulated switchgears have come to be installed to secure an insulation distance and to minimize the installation spaces for equipment.

The gas-insulated switchgear is constructed by connecting a plurality of gas-insulated apparatuses, each of which contains conducting portions in a grounded tank filled with a gas which is excellent in insulation arc-extinguishing performance such as $SF_6$ gas. Since the gas-insulated switchgear is excellent in reliability and reducibility of the installation place, use thereof is being extended to large city areas as a demand for power in the large city areas becomes large in amount and high in density.

A conventional gas-insulated switchgear is formed as follows. That is, a receiving side branch bus container which contains therein a bus electrically connected to a circuit breaker through a current transformer (CT) is connected to a lower portion of a circuit breaker container which contains therein the circuit breaker together with $SF_6$ gas excellent in insulation gas-extinguishing performance, and the bus inside the receiving side branch bus container is connected to a receiving side power cable contained in a receiving side power cable container through a disconnecting switch contained in a disconnecting switch container and led out of the switchgear.

On the other hand, a transmission side branch bus container which contains therein a bus electrically connected to the circuit breaker through another current transformer (CT) is connected to an upper portion of the circuit breaker container on the opposite side to the side on which the above-mentioned receiving side branch bus container is located. The bus inside the transmission side branch bus container is connected to a receiving side power cable contained in a transmission side power cable container and led out of the switchgear. Those apparatus are arranged in an about straight line.

This kind of gas-insulated switchgear is disclosed in JP A 10-285728.

In the above-mentioned conventional construction, the receiving side branch bus container and the transmission side branch bus container extend from upper and lower portions of the circuit breaker container in the opposite direction, respectively, so that it is inevitable that the size in the length direction L becomes large, and as a result, the installation area becomes large. Further, since the receiving side branch bus container and the transmission side branch bus container extend from the upper and lower portions of the circuit breaker container in the opposite direction, respectively, surplus spaces are formed above the receiving side branch bus container and below the transmission side branch bus container and it has a lot of useless spaces.

SUMMARY OF THE INVENTION

The present invention is made in view of the above-mentioned matters and an object of the present invention is to provide a switchgear which is less in useless space and of which an installation area can be reduced.

The present invention to attain the above object resides in a switchgear which is characterized in that a connecting portion to be connected to a transmission side branch bus container and a connecting portion to be connected to a receiving side branch bus container are provided on a circuit breaker container in an up and down relation so as to face the same direction, any one of the transmission side branch bus container and the receiving side branch bus container is connected to the connecting portion positioned on the upper side, and the other is connected to the connecting portion positioned on the lower side, and a transmission side power cable terminal container or a receiving side power cable terminal container is arranged at a position deviated horizontally from the axis of the transmission side branch bus container or the receiving side branch bus container; or in that a connecting portion to be connected to a transmission side branch bus container and a connecting portion to be connected to a receiving side branch bus container are provided on a circuit breaker container in an up and down relation so as to face the same direction, the receiving side branch bus container is connected to the connecting portion positioned on the upper side, and the transmission side branch bus container is connected to the connecting portion positioned on the lower side, and a transmission side power cable terminal container and a receiving side power cable terminal container are arranged so as to oppose each other at positions deviated horizontally from the axes of the transmission side branch bus container and the receiving side branch bus container.

DESCRIPTION OF EMBODIMENTS OF THE INVENTION

Figure 1:
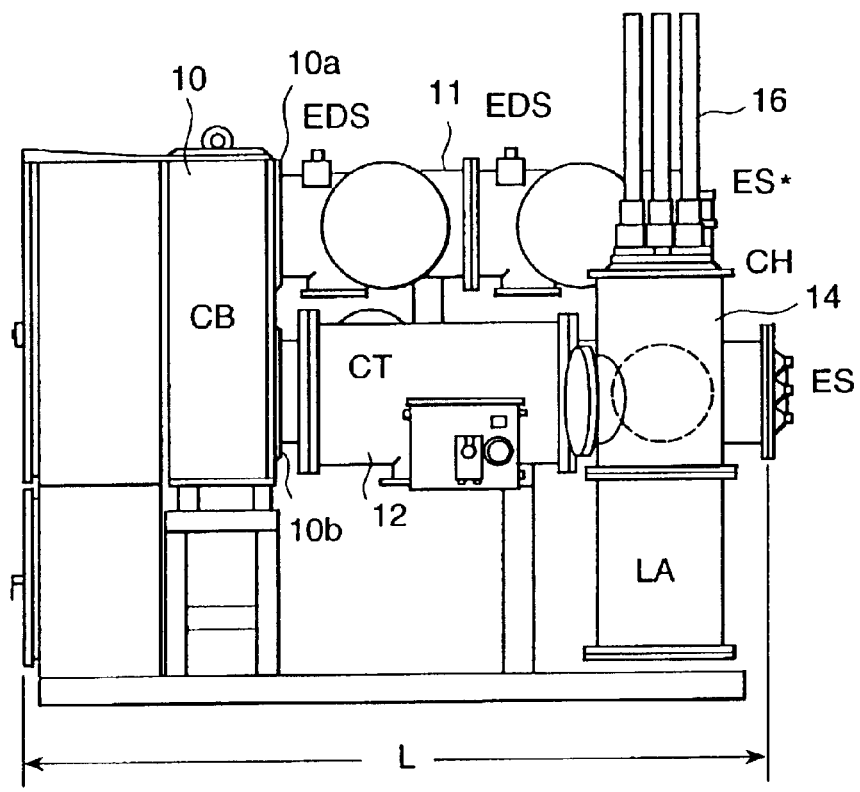
FIG. 1 is a front view of a gas-insulated switchgear which is an embodiment of the present invention.

An embodiment of a switchgear of the present invention will be described hereunder, referring to FIGS. 1 to 3. The following is an explanation of the abbreviated labels used in the drawings:

CB: circuit breaker;
CH: cable head;
CT: current transformer;
EDS: disconnecting switch with earth switch;
ES: earth switch;
EVT: earthed voltage transformer (which is the same as GPT);
GPT: grounded potential transformer;
LA: lightening arrester;
TP: test point;
VT: voltage transformer;
T: transformer; and
L: line.

Figure 2:
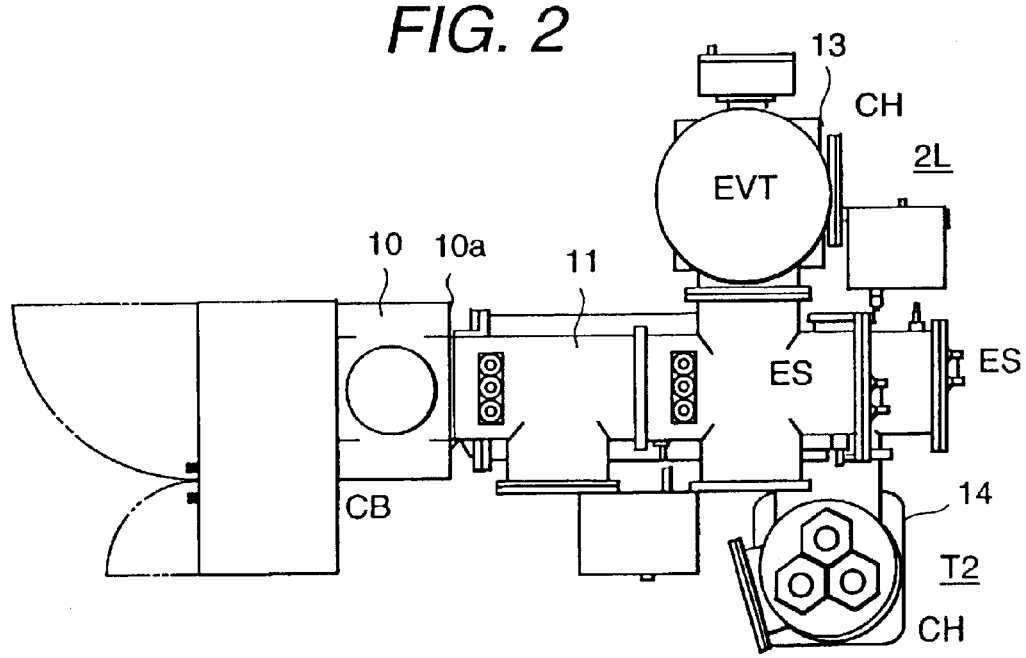
FIG. 2 is a plane view of FIG. 1.
Figure 3:
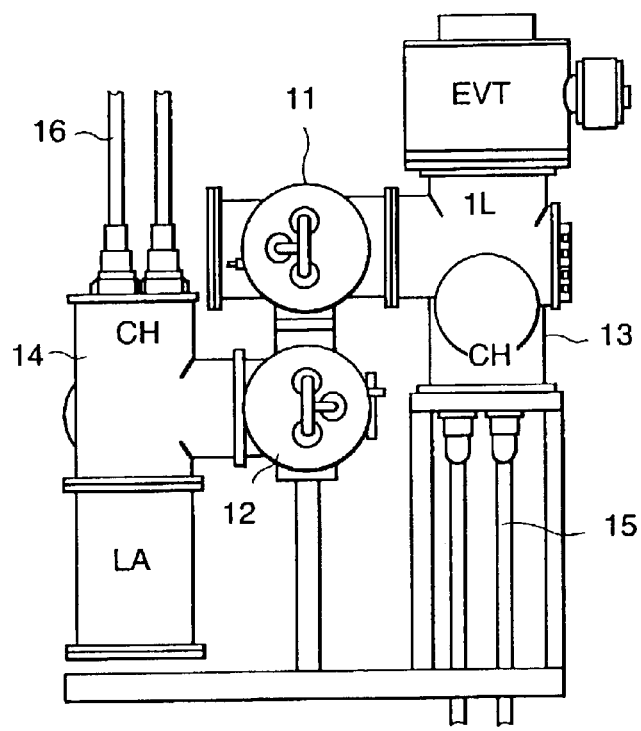
FIG. 3 is a side view of FIG. 1 on a right side.

FIGS. 1 to 3 show a gas-insulated switchgear which is an embodiment of the present invention. In FIGS. 1 to 3, a reference number 10 denotes a circuit breaker container which contains therein a circuit breaker together with a SF6 gas which is excellent in insulation arc-distinguishing performance. Connecting portions 10a, 10b which face in the same direction away from the circuit breaker (right in FIG. 1) are connected to upper arid lower portions of the circuit breaker container 10 substantially in parallel with each other. A receiving side branch bus container 11 which contains therein a bus electrically connected to the circuit beaker is connected to the upper connecting portion 10a, and a transmission side branch bus container 12 which contains therein a bus electrically connected to the circuit beaker is connected to the lower connecting portion 10b. Those receiving side branch bus container 11 and transmission side branch bus container 12 are positioned at upper and lower portions and substantially in parallel to each other, and led out in the same direction.

To the receiving side branch bus container 11 positioned at the upper portion of the circuit breaker container 10, a receiving side power cable terminal container 13 which contains therein a receiving side power cable to be connected to the bus inside the receiving side branch bus container 11 is connected at a position separated or spaced horizontally and at a right angle or perpendicularly (angled to the right when viewed from a front side of FIG. 3) from a longitudinal axis of the receiving side branch bus container 10, and receiving side power cables 15 are led out perpendicularly substantially just under the receiving side power cable terminal container 13 which is positioned at the position angled horizontally rectangularly rightwards. On the other hand, to the transmission side branch bus container 12 positioned at the lower position, a transmission side power cable terminal container 14 which contains therein transmission side power cables to be connected to the bus inside the receiving side branch bus container 12 is connected at a position separated or spaced horizontally and at a right angle or perpendicularly (angled to the left when viewed from a front side of FIG. 3) from a longitudinal axis of the transmission side branch bus container 12, and transmission side power cables 16 are led out at right angle just over from the transmission side power cable terminal container 14 which is angled horizontally perpendicularly leftwards. The receiving side power cable terminal container 13 and the transmission side power cable terminal container 14 are arranged so as to oppose each other.

Figure 4:
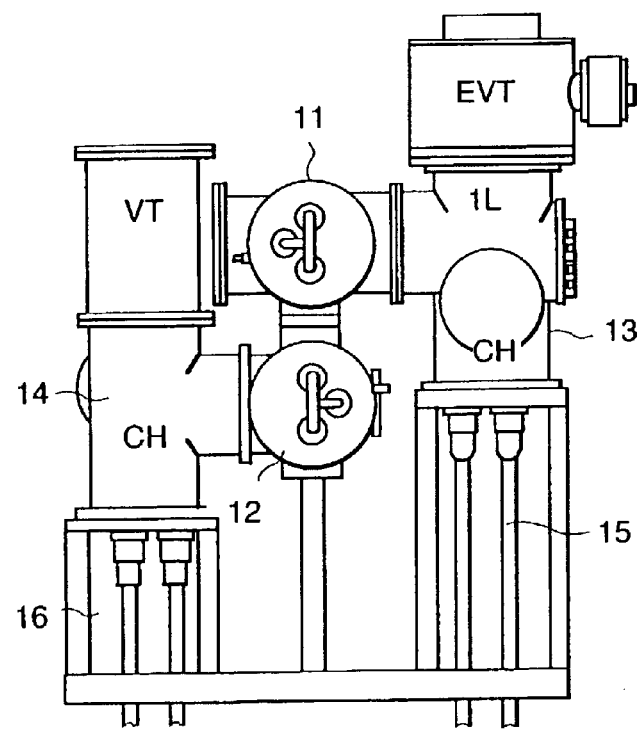
FIG. 4 is a side view, on a right side, of a gas-insulated switchgear which is another embodiment of the present invention, corresponding to FIG. 3.

Further, as shown in FIG. 4, the transmission side power cables 16 can be led out at a right angle just under from the transmission side power cable terminal container 14.

In those constructions of the embodiments, since the connecting portions 10a, 10b which are faced in the same direction are provided on the circuit breaker container 10 in an up and down relation and approximately in parallel to each other, the receiving side branch bus container 11 containing therein the bus to be electrically connected to the circuit beaker is connected to the upper connecting portion 10a, the transmission side branch bus container 12 containing therein the bus to be electrically connected to the circuit breaker is connected to the lower connecting portion 10b, and the receiving side branch bus container 11 and the transmission side branch bus container 12 are positioned in an up and down relation and approximately in parallel to each other and led out in the same direction, useless surplus spaces as formed in conventional switchgears become less or zero and the size L of the length direction can be reduced, whereby the installation area can be reduced (reduced to about 80% of that in conventional switchgears). According thereto, it is possible to reduce the size of the whole building covering the whole switchgear and reduce a cost relating to the entire construction. Since the receiving side power cable terminal container 13 is connected to the receiving side branch bus container 11, which is positioned at the upper position, at the position deviated horizontally perpendicularly (deviated rightwards when viewed from the front side of FIG. 3) from the axis of the receiving side branch bus container 11, and the transmission side power cable terminal container 14 is connected to the transmission side power cable terminal container 14, which is positioned at the lower portion, at the position deviated horizontally perpendicularly (deviated leftwards when viewed form the front side of FIG. 3) from the axis of the transmission side branch bus container 12, this also is the factor that useless surplus spaces becomes less or zero and the size L of the length direction is reduced whereby the installation area can be reduced.

Figure 5:
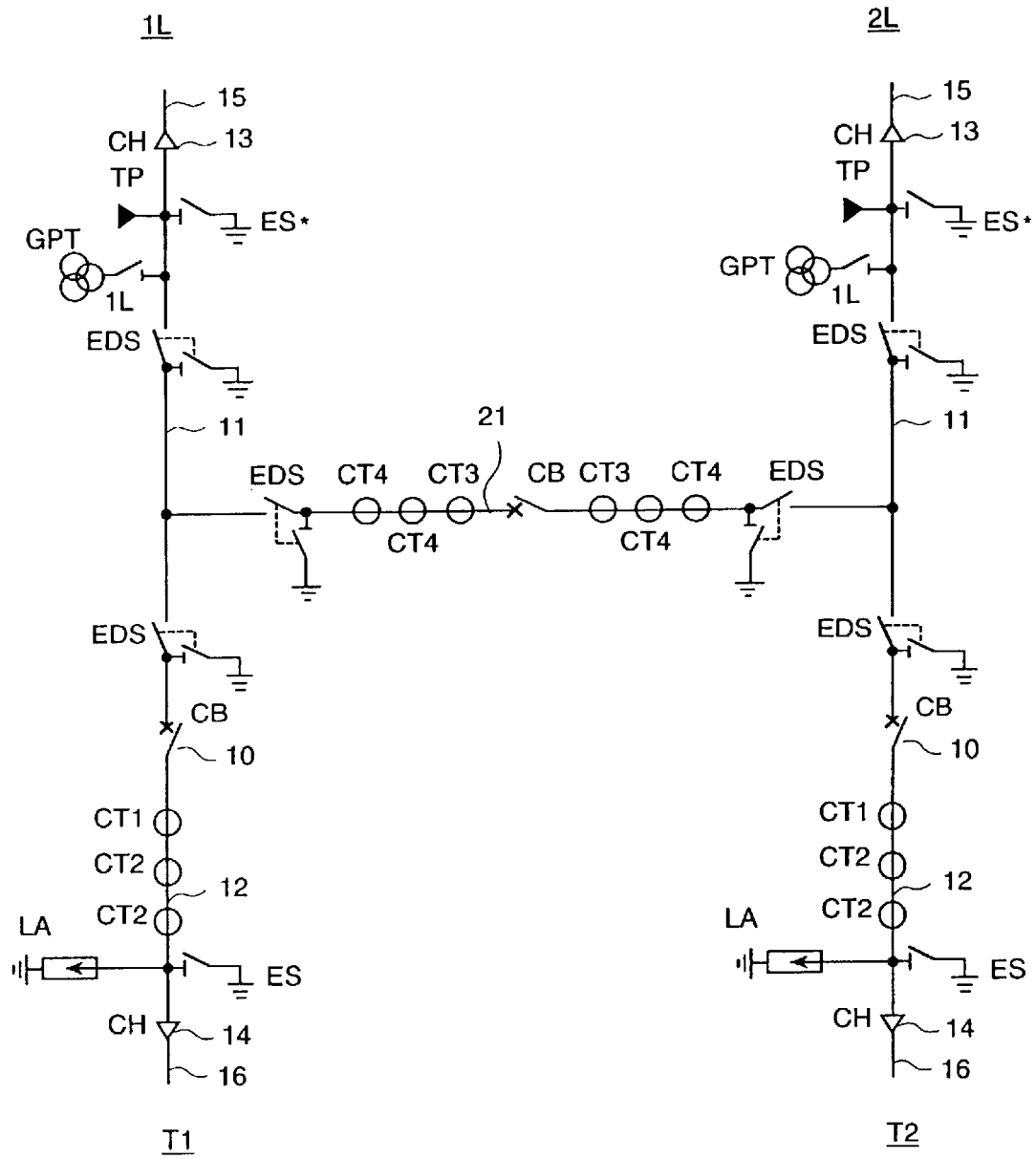
FIG. 5 is a diagram of the whole single line connection of a transformer station in which a gas-insulated switchgear of the present invention is applied.
Figure 6:
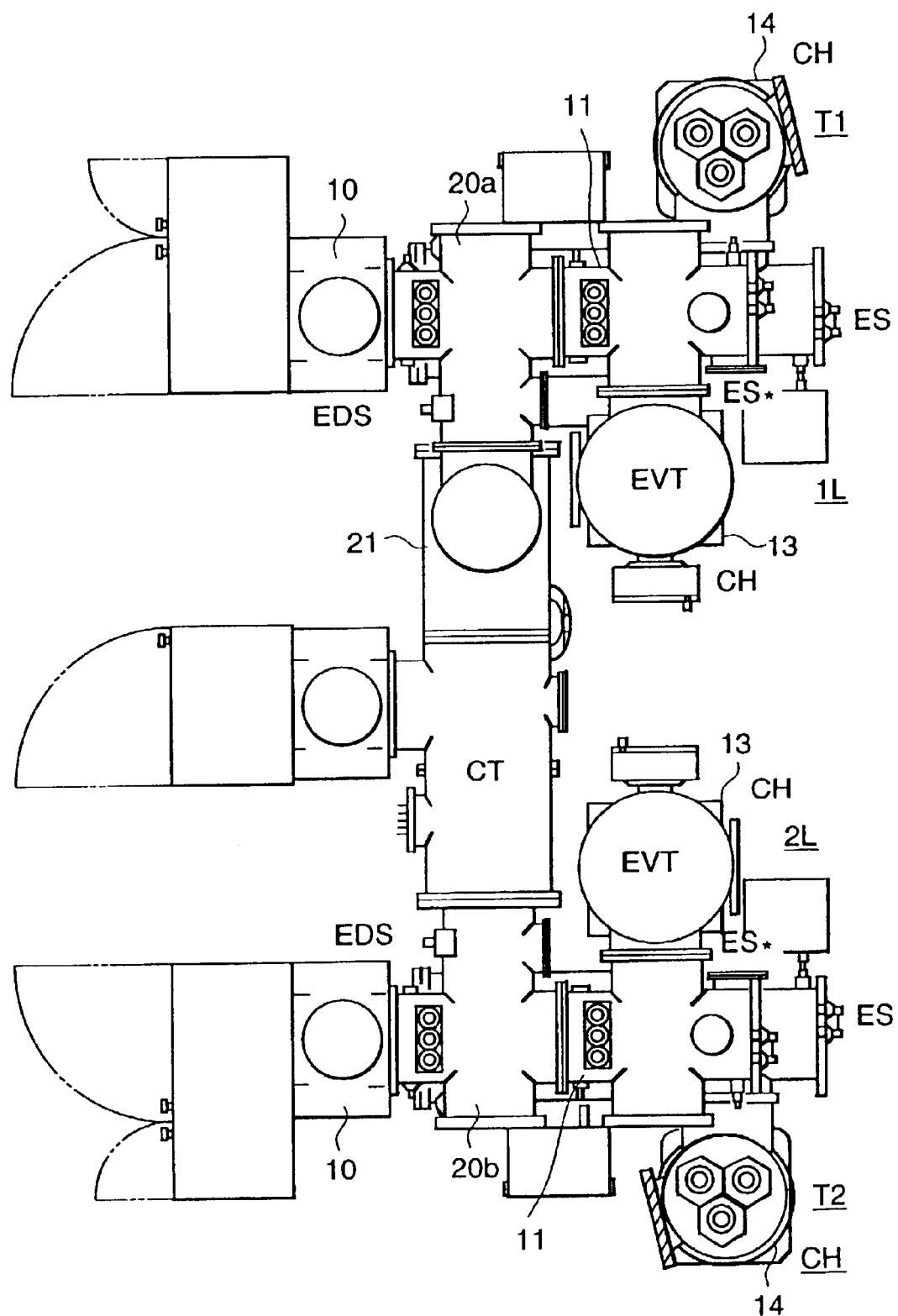
FIG. 6 is a plane view of a system construction of FIG. 5.

FIG. 5 is the whole single line connection line diagram of a transformer station which applies the above-mentioned gas-insulated switchgear, and FIG. 6 shows a system construction thereof. FIGS. 5 and 6 show an example that two circuit lines, each of which applies the gas-insulated switchgear of the construction as shown in FIGS. 1 to 3 (or FIG. 4), are connected by a connecting bus 1L–2L. That is, a plurality of the switchgears each of which has the construction shown in FIGS. 1–3 (or FIG. 4) are arranged in parallel with each other, and a connecting bus container or containers 21 which contain therein connecting buses arranged horizontally approximately perpendicularly to the axis of the transmission side branch bus container 12 or the receiving side branch bus container 11 connect between the plurality of gas-insulated switchgears 20a, 20b.

Those constructions make it possible to realize a compact transformer station.

Further, the present invention is able to be applied not only to a power cable system but also to an overhead electric power line system.

According to the present invention as described above, there is an effect to obtain a switchgear in which useless spaces are made less or zero and an installation area thereof can be reduced.

What is claimed is:

1. A switchgear comprising
a circuit breaker container containing therein a circuit breaker, a transmission side branch bus container and a receiving side branch bus container each of which is connected to said circuit breaker container and contains therein a bus, and a transmission side power cable terminal container and a receiving side power cable terminal container which are connected to said transmission side branch bus container and said receiving side branch bus container and contain therein power cables, respectively, wherein
a connecting portion to be connected to said transmission side branch bus container and a connecting portion to be connected to said receiving side branch bus container are provided on said circuit breaker container and mounted on the same side thereof whereby both connecting portions face in the same direction with one of said connecting portions being positioned above the other connecting portion,
any one of said transmission side branch bus container and said receiving side branch bus container is connected to said connecting portion positioned on an upper side of said circuit breaker container, and the other is connected to said connecting portion positioned on a lower side of said circuit breaker container, and said transmission side power cable terminal container or said receiving side power cable terminal container is arranged at a position spaced horizontally from a longitudinal axis of said transmission side branch bus container or said receiving side branch bus container.

2. A switchgear according to claim 1, wherein said transmission side power cable terminal container or said receiving side power cable terminal container is arranged horizontally rightwards or leftwards from the longitudinal axis of said transmission side branch bus container or said receiving side branch bus container.

3. A switchgear according to claim 1, wherein said transmission side power cable terminal container or said receiving side power cable terminal container is arranged at an approximately right angle and horizontally rightwards or leftwards from the axis of said transmission side branch bus container or said receiving side branch bus container.

4. A switchgear according to claim 1, wherein a power cable contained in said transmission side power cable terminal container or said receiving side power cable terminal container is led out upwards or downwards.

5. A switchgear according to claim 1, wherein a power cable connecting the bus inside said transmission side branch bus container or said receiving side branch bus container and the cable inside said transmission side power cable terminal container or said receiving side power cable terminal container is led out approximately horizontally with respect to the longitudinal axis of said transmission side branch bus container or said receiving side branch bus container.

6. A switchgear comprising a circuit breaker container containing therein a circuit breaker, a transmission side branch bus container and a receiving side branch bus container each of which is connected to said circuit breaker container and contains therein a bus, and a transmission side power cable terminal container and a receiving side power cable terminal container which are connected to said transmission side branch bus container and said receiving side branch bus container and contain therein power cables, respectively, wherein a connecting portion to be connected to said transmission side branch bus container and a connecting portion to be connected to said receiving side branch bus container are provided on said circuit breaker container and mounted on the same side thereof whereby both connecting portions face in the same direction with one of said connecting portions being positioned above the other connecting portion, said receiving side branch bus container is connected to said connecting portion positioned on an upper side of said circuit breaker container, and said transmission side branch bus container is connected to said connecting portion positioned on a lower side of said circuit breaker container, and said transmission side power cable terminal container and said receiving side power cable terminal container are arranged so as to oppose each other at positions spaced horizontally from longitudinal axes of said transmission side branch bus container and said receiving side branch bus container.

7. A switchgear according to claim 6, wherein said transmission side power cable terminal container and said receiving side power cable terminal container are arranged at the positions spaced horizontally at an approximately right angle from the longitudinal axes of said transmission side branch bus container and said receiving side branch bus container.

8. A switchgear according to claim 6, wherein power cables contained in said transmission side power cable terminal container and said receiving side power cable terminal container are led out in a vertical direction.

9. A switchgear comprising:

a circuit breaker container containing therein a circuit breaker, a transmission side branch bus container and a receiving side branch bus container each of which is connected to said circuit breaker container and contains therein a bus, and a transmission side power cable terminal container and a receiving side power cable terminal container which are connected to said transmission side branch bus container and said receiving side branch bus container and contain therein power cables, respectively, said receiving side branch bus container and said transmission side branch bus container being connected to a vertical side portion of said circuit breaker container to be substantially in parallel with each other and extending in the same direction from said circuit breaker container one of said receiving side branch bus container and said transmission side branch bus container being positioned above the other, wherein said transmission side power cable terminal container and said receiving side power cable terminal container are connected to said transmission side branch bus container and said receiving side branch bus container so as to be disposed on horizontally opposite sides of said transmission side branch bus container and said receiving side branch bus container, respectively, and said transmission side power cable terminal container and said receiving side power cable terminal container have vertically extending portions, respectively.

* * * * *